H. ALLEN.
DISINTEGRATING MACHINE.
APPLICATION FILED AUG. 20, 1917.
1,340,201.
Patented May 18, 1920.
3 SHEETS—SHEET 3.
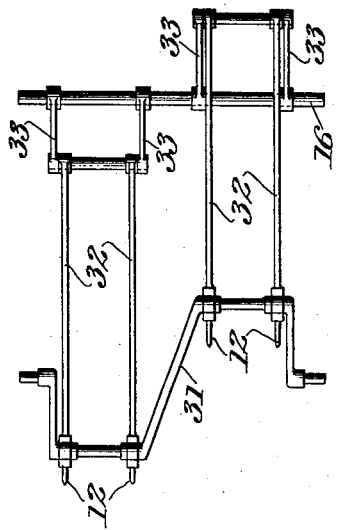
Inventor
Herbert Allen
by Wm. N. Finckel
Attorney

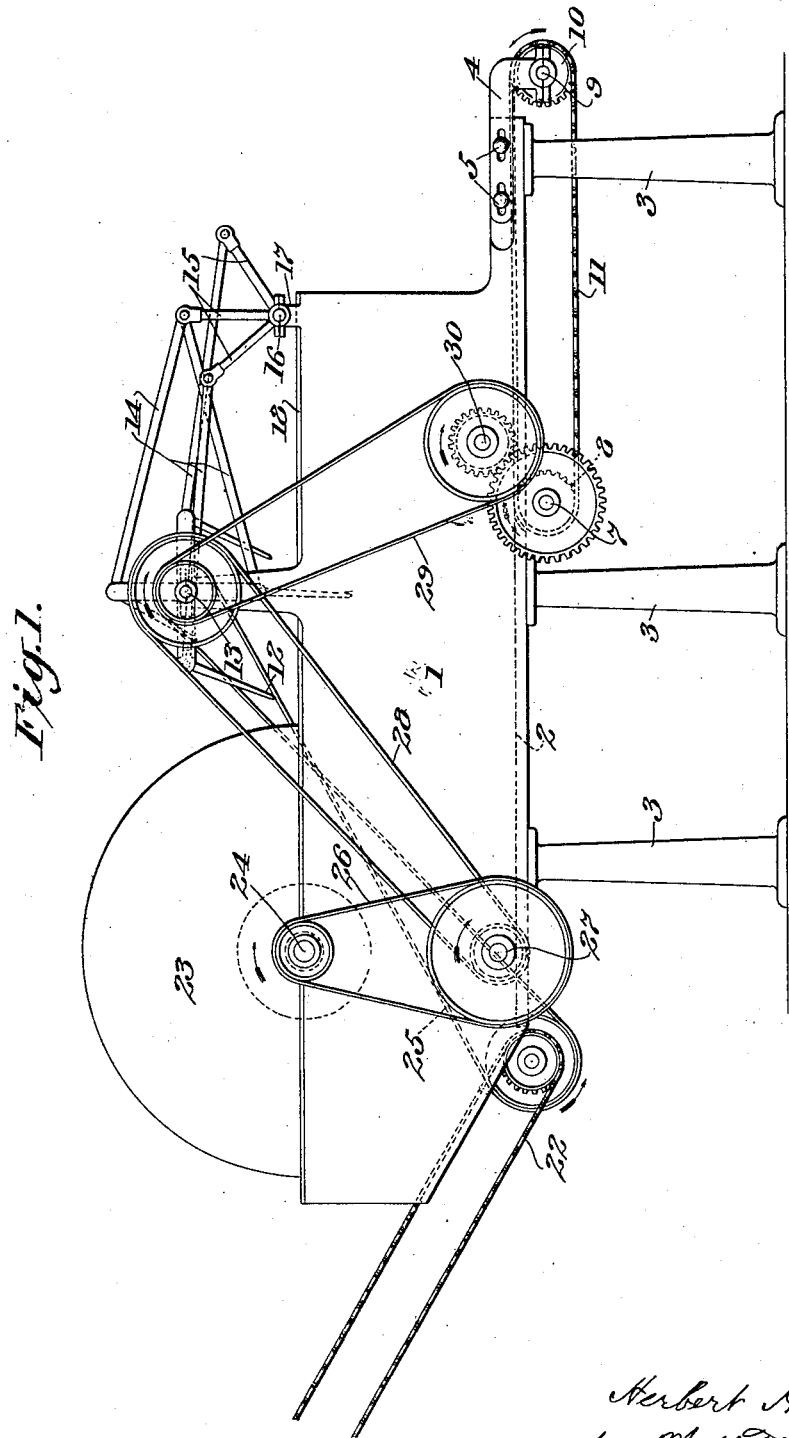

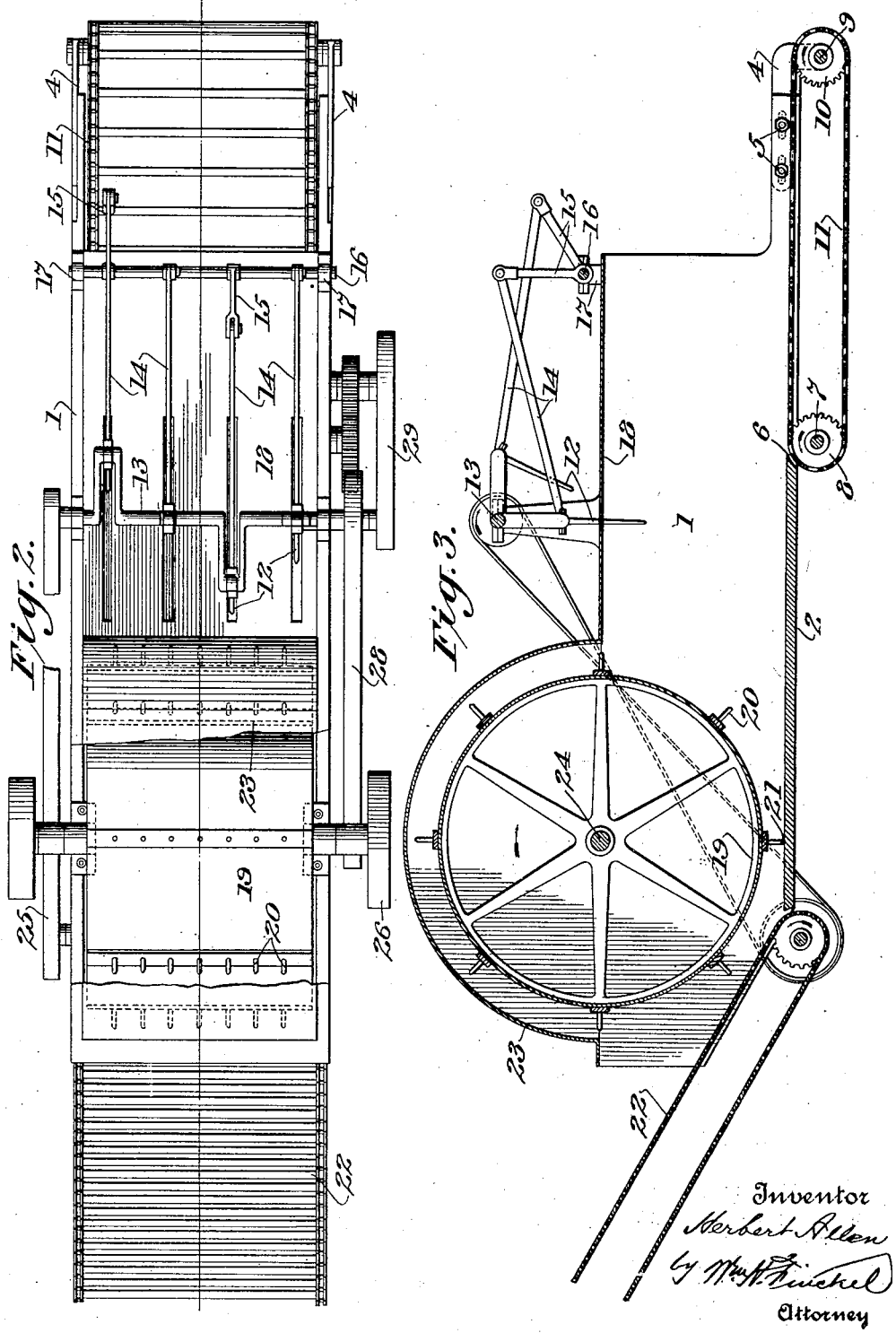

UNITED STATES PATENT OFFICE.

HERBERT ALLEN, OF SOMERSET, OHIO.

DISINTEGRATING-MACHINE.

1,340,201.   Specification of Letters Patent.   Patented May 18, 1920.

Application filed August 20, 1917. Serial No. 187,280.

*To all whom it may concern:*

Be it known that I, HERBERT ALLEN, a citizen of the United States, residing at Somerset, in the county of Perry and State of Ohio, have invented a certain new and useful Disintegrating-Machine, of which the following is a full, clear, and exact description.

The object of this invention is to provide a machine by means of which bales of straw, grass, hay, excelsior and the like may be quickly and effectively broken up or disintegrated so that the material or substance may be readily and conveniently available for packing glass, china, and other fragile or easily frangible goods, as well as for other uses.

The invention consists of a machine having means for feeding baled material of the character described to movable fingers, which dig into the bale with a dragging action and loosen the material and then deliver the loosened material to a toothed cylinder or drum for further separation or disintegration, whence the material is carried to the place of use or distribution, as I will proceed now to explain and finally claim.

In the accompanying drawings illustrating the invention, in the several figures of which like parts are similarly designated, Figure 1 is a side elevation. Fig. 2 is a top plan view. Fig. 3 is a longitudinal vertical section. Fig. 4 is an end elevation. Fig. 5 is a plan view of a modification of the fingers.

As one illustration of the principle of the invention, I have shown in the drawings and will now proceed to explain in detail, a machine especially adapted for breaking up, opening up, or disintegrating bales of straw, in such way as to make the straw readily available for the use of packers in packing glassware or other frangible or fragile goods.

The machine comprises a box 1, open at both ends, and having a floor 2 which may be level or more or less inclined upwardly toward the rear, and mounted upon suitable legs or columns 3. At one end of this box and on opposite sides are arranged adjustable brackets 4, made adjustable upon the sides of the box by any suitable means, such as slots and bolts 5. Beneath a transverse opening 6 in the floor and in suitable bearings is mounted a shaft 7, having on its opposite ends sprocket wheels 8. In the brackets 4 is a parallel shaft 9 also having sprocket wheels 10, and on these sprocket wheels 8 and 10 is mounted an endless carrier 11. The adjustable brackets 4 may be used to put the proper tension on the carrier 11. This carrier is so mounted and actuated that its upper surface moves toward the box, and the carrier is designed to receive a bale to be opened or disintegrated and to feed it forward into the box, a second bale being placed behind the first bale, or other pressure similarly exerted, so as to forward the bale to the disintegrating agents and insure every portion of the leading bale being torn apart. The bale is first attacked by a series of fingers 12, mounted above and in advance of the carrier, and adapted to receive a digging and dragging or pushing motion so that they may enter the bale and pull apart its contents, or disintegrate it. A variety of means may be used for giving this motion to the fingers, two of which only are here shown. Referring to Figs. 1, 2 and 3, the fingers are mounted upon the crank elements of the quartering crank shaft 13, and each crank or finger is connected by a link, bar, or rod 14 with an arm 15 mounted on a rod or bar 16 which in turn is mounted in bearings 17 on the box; or these arms may be pivotally mounted upon individual bearings as desired. If desired, a slotted plate 18 may be arranged beneath the shaft 13 through which the fingers move up and down and back and forth, and this plate may serve to prevent the loosened material from following the fingers as they rise.

The material as it is released from the bale is thrown against a cylinder or drum 19, mounted in bearings on the box in advance of the fingers, and having transverse rows of radial teeth 20 on its periphery which coöperate with clearing teeth 21 on the floor of the box to assist in loosening the "mats" or bunches of material that might cling together by reason of dampness. The loosened material is discharged upon an endless elevator 22 of any suitable construction, which is mounted at the end of the box underneath the toothed drum. The toothed cylinder or drum preferably is incased so as to prevent the material and any dust from flying out of the machine, and for this purpose any suitable sheet metal or other casing 23 may be mounted over the cylinder or drum and upon the box.

Motion may be given to the machinery by any suitable means, and in any suitable way, as for instance by using the shaft 24 as the main shaft. In order to reduce speed the shaft 13 and carrier 22 may be connected by belt 25, the transmission being by means of belt 26 from shaft 24 to a pulley on the stud shaft 27, and thence by belt 28 to the crank shaft 13, and thence by belt 29 to a stud shaft 30, which last may be geared or belted to the carrier shaft 7.

As shown in Fig. 5, I may use instead of the quartering crank shaft 13 a double crank shaft 31, and employ in each crank element two or more fingers and connect them in any suitable way, as by links or rods 32, with the bearing shaft 16, having the pairs of arms 33.

By using a crank shaft some of the fingers are receding from the bale to take a fresh hold thereon while others are acting to break up the bale, but if desired any number of fingers or all of the fingers may be arranged to operate in unison, and in such case the supports for the fingers and the arms themselves will be modified accordingly, as, for example, referring to Fig. 5, instead of having two cranked portions in the rod or bar 16, and the shaft 31, there will be one only in each of them.

As already sufficiently indicated, the machine may be used to disintegrate or break up or tear up a bale of straw or other material so as to loosen up its fibers or filaments in order to put them in condition for their intended use, and to this end the bale may be placed upon the carrier 11 and its bands or ties removed, and then motion is imparted to the machinery so as to cause the carrier to advance the bale toward the disintegrating fingers and toothed drum, the bale in its movement in that direction being first attacked by the fingers 12 and the material thus released then caught up by the toothed drum and carried forward. As the moving bale is being disintegrated, a second bale may be placed upon the carrier behind the first, so as to insure the forwarding of the leading bale to be acted upon first by the fingers and then by the toothed drum.

Variations in construction, other than those already herein referred to, are contemplated as within the principle and scope of the invention.

What I claim is:—

1. A machine for disintegrating bales of straw and other material, comprising a box, an endless traveling carrier in the box for receiving a bale of material from which the ties or bands have been removed and presenting said bale to the aftermentioned disintegrating elements, a series of disintegrating fingers, a crank shaft mounted upon the box and upon which the fingers are mounted and by the rotation of the shaft raised and then forcibly lowered and caused first to dig into the bale which is fed to them by the carrier and then draw away from the bale in the direction of its feed and drag out and loosen its constituent material, and a rotary toothed drum mounted in the farther end of the box in line with the fingers and to which the thus loosened material is delivered and by which it is further disintegrated or separated and rendered fit for its intended use.

2. In a machine for disintegrating bales of straw and other material, a box, an endless traveling carrier arranged in the bottom of one end of the box and adapted to feed a bale into the box, a crank shaft mounted on the upper portion of the box, fingers carried by said shaft, pivotally mounted connecting bars having their inner opposite ends applied to the fingers, the rotation of said shaft in connection with the connecting bars serving to drive the fingers into the bale and then thrust them forward toward the aftermentioned drum and thereby loosen the material of the bale and drag it toward the drum, and a rotary toothed drum mounted in the farther end of the box and to which the thus loosened material is delivered by the fingers for further separation ready for use for packing china and like goods.

3. In a machine for disintegrating bales of straw and other material, a box, a carrier arranged in the bottom of one end of the box and adapted to feed a bale into the box, a rotary crank shaft mounted on the upper portion of the box and having reciprocating fingers thereon adapted to be driven into the bale, bars pivoted at one end and having their other ends connected with the fingers to impart a forward thrust to the fingers as they are reciprocated by the rotary shaft to thereby loosen the material of the bale, means arranged next to the fingers and adapted to receive the material from the fingers and to further separate it and prepare it for use for packing fragile or frangible goods, and means for carrying away from the machine the thus last separated material.

In testimony whereof I have hereunto set my hand this sixteenth day of August, A. D. 1917.

HERBERT ALLEN.

Witnesses:
  D. M. REAM,
  CARL FINCH.